United States Patent
Slesinski et al.

(10) Patent No.: US 10,605,331 B2
(45) Date of Patent: Mar. 31, 2020

(54) INTERNAL LUBE TANK LUBE LEVEL CONTROL SYSTEM

(71) Applicant: Dana Heavy Vehicle Systems Group, LLC, Maumee, OH (US)

(72) Inventors: Steven G. Slesinski, Ann Arbor, MI (US); Harry W. Trost, Royal Oak, MI (US)

(73) Assignee: Dana Heavy Vehicle Systems, LLC, Maumee, OH (US)

( * ) Notice: Subject to any disclaimer, the term of this patent is extended or adjusted under 35 U.S.C. 154(b) by 0 days.

(21) Appl. No.: 16/565,741

(22) Filed: Sep. 10, 2019

(65) Prior Publication Data

US 2020/0003276 A1 Jan. 2, 2020

Related U.S. Application Data

(62) Division of application No. 15/157,561, filed on May 18, 2016, now Pat. No. 10,458,517.

(60) Provisional application No. 62/165,367, filed on May 22, 2015.

(51) Int. Cl.
  *F16H 57/04* (2010.01)
  *F16H 1/00* (2006.01)
(52) U.S. Cl.
  CPC ..................................... *F16H 1/00* (2013.01)
(58) Field of Classification Search
  CPC .......................... F16H 57/045; F16H 57/0483
  See application file for complete search history.

(56) References Cited

U.S. PATENT DOCUMENTS

| | | | |
|---|---|---|---|
| 2,622,699 A | 12/1952 | Mills | |
| 4,082,170 A | 4/1978 | Ritter | |
| 4,468,981 A | 9/1984 | Ries | |
| 4,526,054 A * | 7/1985 | Ehrlinger | F16H 57/0447 184/6.12 |
| 4,658,665 A | 4/1987 | Strinzel | |
| 4,736,819 A * | 4/1988 | Muller | F16H 57/0447 123/196 AB |
| 5,099,715 A | 3/1992 | Baiker | |
| 5,121,815 A | 6/1992 | Francois | |
| 5,251,725 A | 10/1993 | Barrett, Jr. | |
| 5,279,391 A | 1/1994 | Ward | |
| 5,294,350 A | 3/1994 | Murphy | |
| 5,643,127 A | 7/1997 | Yoshii | |

(Continued)

FOREIGN PATENT DOCUMENTS

| | | |
|---|---|---|
| DE | 10359505 | 7/2005 |
| EP | 0731291 | 9/1996 |

(Continued)

*Primary Examiner* — Tisha D Lewis
(74) *Attorney, Agent, or Firm* — Marshall & Melhorn, LLC

(57) ABSTRACT

A mechanical device lubrication level control system operates within a mechanical housing having a sump cavity and a lubricant director, where the lubricant director is located at the bottom of the housing. A mechanical gear set is located in the sump cavity and a lube tank is located in the lubricant director. There is located within in lube tank either a motor with a pump or an expandable air bladder that is inflatable by an air source. For the lube tank having the motor with the pump, the pump controls the lubricant within the sump cavity. For the lube tank having the expandable air bladder, the air source controls the lubricant within the sump cavity.

10 Claims, 2 Drawing Sheets

(56) References Cited

U.S. PATENT DOCUMENTS

| | | |
|---|---|---|
| 5,709,135 A | 1/1998 | Baxter |
| 6,299,561 B1 | 10/2001 | Kramer |
| 6,702,703 B2 | 3/2004 | Gervais, III |
| 6,938,731 B2 | 9/2005 | Slesinski |
| 6,997,841 B2 | 2/2006 | Wagle |
| 7,445,574 B2 | 11/2008 | Weith |
| 7,611,435 B2 | 11/2009 | Beutler |
| 8,152,674 B2 | 4/2012 | Hayes |
| 8,360,915 B2 | 1/2013 | Gianone |
| 8,469,852 B2 | 6/2013 | Gianone |
| 8,707,815 B2 | 4/2014 | Voth |
| 10,036,467 B2 * | 7/2018 | Keane ................. F16H 57/0483 |
| 2006/0189434 A1 | 8/2006 | Usami |
| 2010/0332089 A1 | 12/2010 | Gianone |
| 2014/0172250 A1 | 6/2014 | Tamai |
| 2014/0243137 A1 | 8/2014 | Kwasniewski |
| 2014/0335990 A1 | 11/2014 | Martucci |
| 2017/0175874 A1 | 6/2017 | Schwarz |

FOREIGN PATENT DOCUMENTS

| | | | | |
|---|---|---|---|---|
| JP | 2006200730 A | * | 8/2006 | ......... F16H 57/0483 |
| JP | 2007107688 | | 4/2007 | |
| JP | 2018152946 A | * | 9/2018 | .............. B60L 15/20 |

* cited by examiner

INTERNAL LUBE TANK LUBE LEVEL CONTROL SYSTEM

CROSS-REFERENCE TO RELATED APPLICATIONS

This application is a divisional of U.S. patent application Ser. No. 15/157,561 filed on May 18, 2016, which claims priority to U.S. Provisional Application No. 62/165,367 filed on May 22, 2015, the contents of which are fully incorporated herein by reference.

FIELD

The present invention disclosure relates to a mechanical device lubrication level control system. More particularly, the present invention relates to a lubrication level control system in a vehicle differential housing.

BACKGROUND

It is necessary to utilize a lubricant within a housing of a mechanical device so as to smoothly operate the mechanical device and reduce wear therein. For example, an axle gear set in a vehicle differential axle housing has contact surfaces that mesh continuously, wherein viscous oil "splashes" within the differential axle housing. As a result, wear protection is provided for the axle gear set, for example, axle, ring, and spider gears, by having the oil flow onto and around the contact surfaces. In addition, the lubricant provides a way to transfer heat generated by friction at the contact surfaces. This aids in achieving a smooth operation and a reduction of wear of the mating gears. Unfortunately, the mechanical device experiences power loss due to viscous oil drag resulting from the viscous oil resisting the motion of the rotating gears.

As a result, automotive manufacturers seek ways to control the amount of lubricant that splashes within vehicle differential axle housings. For example, U.S. Pat. No. 8,152,674 to Hayes includes an auxiliary lubrication pump with an internal cavity of a carrier housing. The auxiliary lubrication pump includes a first gear that is driven by the differential gear assembly and, subsequently, a second gear that is driven by the first gear. Consequently, these two gears cooperate to direct and control lubrication within the carrier housing.

U.S. Pat. No. 6,938,731 to Slesinski teaches an insert that is disposed at the bottom of a differential gear housing, wherein the insert deflects lubricant away from a reservoir upon rotation of a differential gear set. The Slesinski patent is incorporated by reference herein, in its entirety.

Unfortunately, in both of the above-noted patents, control of the lubricant relies upon the individual differential gears moving the lubricant. This in turn, results in oil loss and added heat buildup in the differential gear housing, which results in reducing the efficiency and reliability of the differential gear assembly.

Consequently, what is sought is a lubrication system that reduces oil loss, provides reduced wear at contact surfaces of a gear set, reduces weight, is improves heat transfer, reduces oil drag on parts, and uses less oil, thereby better utilizing the oil and energy more efficiently along with other benefits, while still providing sufficient availability of the oil.

SUMMARY

In an embodiment, a mechanical device lubrication level control system operating within a mechanical housing has a sump cavity therein, where gears and a lubricant director are located. The lubricant director is selected from a group consisting of a motor with a pump having a pick-up/return tube and a pump tube, and an expandable/collapsible air bladder that is inflatable by way of an air source. Both lubricant directors control a lubricant level within the mechanical housing.

In another embodiment, a mechanical device lubrication level control system includes a differential axle housing, with a sump cavity having an axle gear set disposed therein, capable of containing a lubricant therein. The control system also includes a lubricant director having a lube tank, with an expandable bladder disposed therein, wherein the lube tank is capable of containing a lubricant therein, and wherein the lube tank is separate from the sump cavity. The sump cavity and the lubricant director are hydraulically connected by a passage hole and the bladder is in pneumatic communication with an air pressure source, by way of an air tube.

Further objects and advantages of the present invention will be apparent from the following description, reference being made to the accompanying drawings forming a part of a specification, wherein like reference characters designate corresponding parts of several views.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Disclosed herein is a mechanical device lubrication level control system that may be used in automotive, off-road vehicle, all-terrain vehicle, construction, and structural applications. As a non-limiting example, the mechanical device lubrication level control system disclosed herein may also be used in passenger vehicle, electric vehicle, hybrid vehicle, commercial vehicle, autonomous vehicles, semi-autonomous vehicles and/or heavy vehicle applications.

Figure 1:
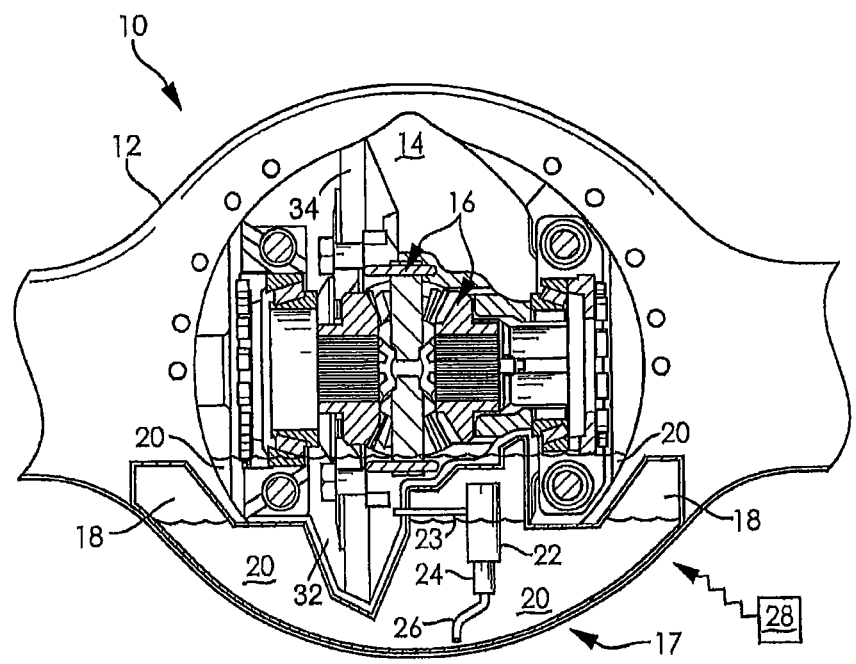
FIG. 1 illustrates a schematic cut-away plan view of a first vehicle differential with a first lubrication level control system therein, in accordance with the present invention.

A first mechanical device lubrication level control system 10 is illustrated in FIG. 1 having a differential axle housing 12, with a sump cavity 14 therein. The first lubrication level control system 10 further comprises an axle gear set 16, which is common in the art, having meshing contact with corresponding gears therein. Shown at and across the bottom of the sump cavity 14 of the first lubrication level control system 10 is a first lubricant director 17 that comprises a lube tank 18, with lubricant 20 contained therein.

Figure 3:
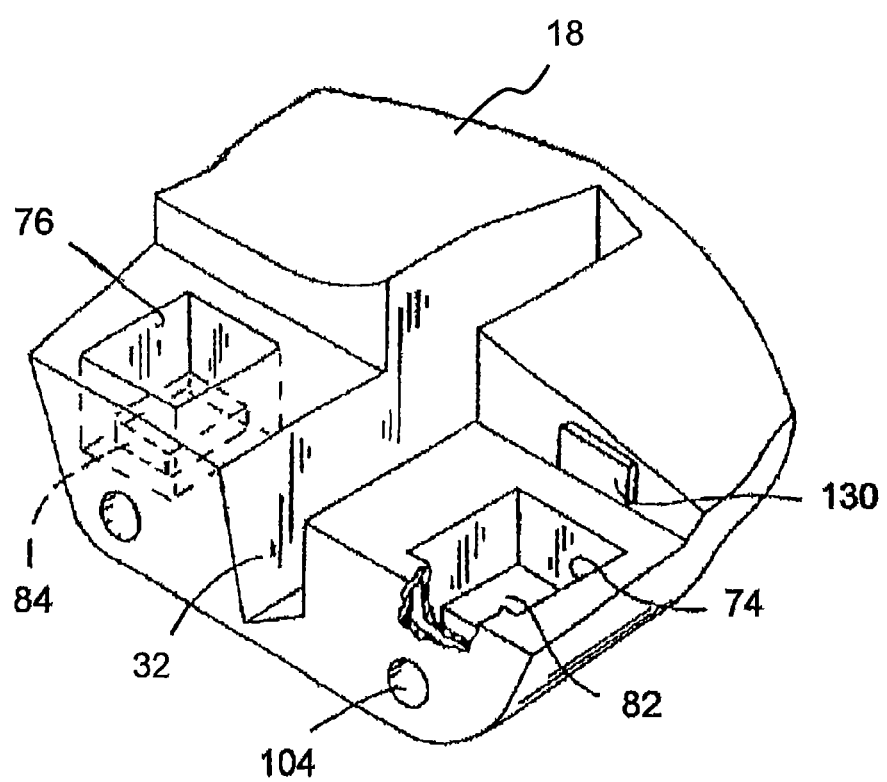
FIG. 3 is a three dimensional orthogonal view of a lube tank, in accordance with the subject invention.

FIG. 3 illustrates the lube tank 18, which in the Slesinski patent is identified as an insert 70. Since the lube tank 18 is located across the bottom of the differential axle housing 12, excess lubricant 20 is naturally drawn toward the lube tank 18, due to gravity. As disclosed in Slesinski, the lube tank 18 displaces a volume of the lubricant 20 in the bottom of the differential axle housing 12. In the first mechanical device lubrication level control system 10, however, storage of lubricant 20 in the lube tank 18 is used to control an excess of lubricant 20 that can later be utilized by the axle gear set 16.

Specifically, the lube tank 18 comprises a polymeric shell that may comprise, for example, closed-cell foam, ABS, PVC plastic or other suitable alternatives. The lube tank 18 is hollow therein, where the lubricant 20 is collected. As further shown in FIG. 3, on the top of the lube tank 18, there are pockets 74, 76 that form enclosed pools where foundry sand and ferro-metallic contaminants (not shown) accumulate. Magnets 82, 84 are disposed in the pockets 74, 76, for containing the ferro-metallic contaminants. The lube tank 18 has a ring gear pocket 32 which provides clearance for a ring gear 34 that is shown in FIG. 1. Bores 104 are used for fastening the lube tank 18 within the differential axle housing 12, wherein Slesinski provides further details on how the lube tank is secured to the differential axle housing 12. Filter media 130 is connected to the lube tank 18 so as to further entrap lubricant contaminants.

A pump 22, for example, a gerotor pump, is affixed to the inside of the lube tank 18, and attached to a pump tube 23. Although the pump tube 23 protrudes into the ring gear pocket 32, anywhere within the sump cavity 14 that does not conflict with the flow of the lubricant is suitable. The pump tube 23 is located at the top of the lube tank 18. Although the pump 22 is small and lightweight, the pump 22 is powerful enough to move the lubricant 20, typically high viscous oil, from the lube tank 18 to the sump cavity 14 and vice versa, by way of the pump tube 23 and pick-up/return tube 26.

By moving the lubricant 20 to the sump cavity 14 and beyond, as taught by Slesinski, the lubricant 20 acts to cool the axle gear set 16 by transferring heat away therefrom. This is achieved within the sump cavity 14 by the lubricant 20 being "splashed" onto the axle gear set 16 and by the rotation of the axle gear set 16 to move the lubricant 20 around in the sump cavity and associated space connected to the sump cavity.

Hence, not only are the contact surfaces of the axle gear set 16 being lubricated, but these contact surfaces are being cooled. The pump 22 is reversibly controlled by a motor 24, which in turn is controlled by a first controller 28. The first controller 28 may, for example, be a vehicle electronic control unit (ECU) that remotely controls the motor 24, as indicated by the zig-zag arrow shown in FIG. 1. It is also possible that the first controller 28 may simply be realized as a wheel speed sensor that would turn the pump 22 on and off as a function of the wheel speed. It is also possible that the first controller 28 could simply be an in-dash switch (not shown but common in the art) that a vehicle driver would control.

More specifically, the first low loss lubrication system 10 operates in the following manner. When the ECU has been instructed or determines that the axle gear set 16 is in need of the lubricant 20 (for example, heat build-up at the meshing axle gear set 16, low lubricant level in the sump cavity 14, or a timing command built into the ECU), the motor 24 is powered by the ECU to run. Consequently, the pump 22 is caused to pump lubricant 20 up the pick-up tube 26, out of the lube tank 18, and into the sump cavity 14, thereby making more lubricant 20 available for "splashing" onto the axle gear set 16.

The opposite procedure is executed when the axle gear set 16 is running at high speed, wherein lubricant 20 is removed from the sump cavity 14 and pumped back into the lube tank 18. Specifically, the ECU is instructed or determines that the lubricant level in the sump cavity 14 needs to be lowered. Consequently, the motor 24 is reversed by the ECU, so as to pump lubricant 20 through the pick-up/return tube 26, from the sump cavity 14, and into the lube tank 18, thereby making less lubricant 20 available for the axle gear set 16.

Figure 2:
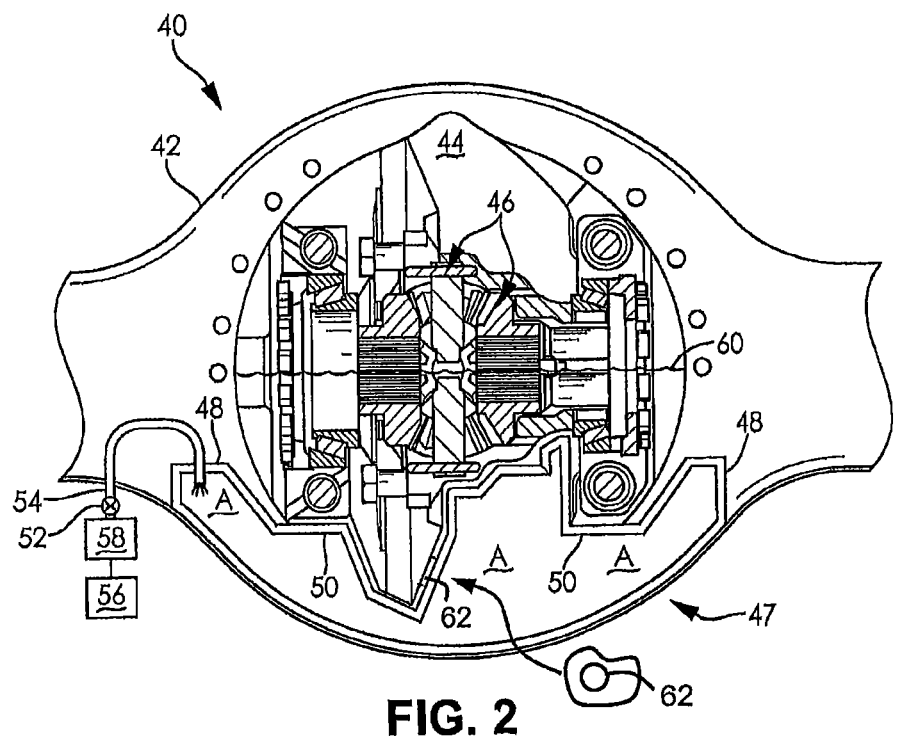
FIG. 2 is a cut-away plan view of a second vehicle differential with a second lubrication level control system therein, in accordance with the present invention.

A second mechanical device lubrication level control system 40 is illustrated in FIG. 2 having a second differential axle housing 42 with a sump cavity 44 therein. The second lubrication level control system 40 further comprises a second axle gear set 46, which is common in the art, in meshing contact therewith. Shown extending across approximately the lowest quarter of the second lubrication level control system 40 (but not limited to this level) is a second lubricant director 47 that comprises a second lube tank 48 with an expandable air bladder 50 disposed therein. The air bladder 50 is shown fully expanded having air A contained therein. Consequently, the lubricant 60 level in FIG. 2 is shown at a midway point in the second differential axle housing 42 (but not limited to this level).

In contrast to the first mechanical device lubrication level control system 10, the lube tank 48 of the second mechanical device lubrication level control system 40 is not a separate structure like the lube tank 18 that is shown in FIG. 3. Instead, the second lube tank 48 is a specific volume at the bottom of the sump cavity 44, where lubricant 60 tends to collect due to gravity. Subsequently, when the bladder 50 deflates, the lubricant 60 passes through a passage hole 62 and down into the lube tank 48, which tends to fill up the lower portion of the second lube tank 48. On the other hand, as the bladder 50 becomes inflated by air being introduced through an air tube 54, the lubricant 60 tends to rise up, pass through the passage hole 62, and enter the sump cavity 44, thereby providing more lubricant 60 to the axle gear set 46.

Specifically, the air tube 54 protrudes through and is fixedly attached to both the differential axle housing 42 and the lube tank 48, and then protrudes through and is fixedly attached to an upper portion of the air bladder 50. The air tube 54 is in pneumatic communication with and connected to an air pressure source 56, for example, a vehicle air pressure tank used for differential locking and/or braking. Since, the base air pressure in the vehicle air pressure source 56 is on the order of 120 psi, which would overstress the air bladder 50, then a pressure regulator 52 is disposed between the air tube 54 and the air pressure source 56. Consequently, the operating pressure within the air bladder would be lowered to, for example, 30 psi.

The release or removal of pressurized air A from the air pressure source 56, by way of the pressure regulator 52, may be controlled by a second controller 58, for example, a vehicle electronic control unit ECU. It is also possible that the second controller 58 may simply be realized as a wheel speed sensor that would release or remove pressurized air A from the air pressure source 56. Further; it is possible that the second controller 58 could simply be an in-dash switch (not shown but common in the art) that a vehicle driver controls.

Hence, the second low loss lubrication system 40 operates in the following manner. When the second controller 58 has been instructed or determines that the axle gear set 46 is in need of additional lubricant 60 (for example, heat build-up at the meshing axle gear set 46 or low lubricant level in the sump cavity 44), the second controller 58 causes pressurized air A from the air pressure source 56 to enter the bladder 50, by way of the air tube 54. Consequently, the pressurized air A expands the bladder 50 within the space of the lube tank 48, causing the lubricant 60 to move up in the sump cavity 44, thereby providing more of the lubricant 60 for "splashing" onto the axle gear set 46. On the other hand, if less lubricant 60 is needed then the bladder is deflated, which lowers the lubricant level within the sump cavity 44 by deflating the bladder 50.

Consequently, the lubricant 60 proceeds to take up space within the top of the second lube tank 48.

In both of the above-noted low loss lubrication systems 10, 40, control of the lubricants 20, 60 does not rely directly upon the differential gear sets themselves to move the lubricants 20, 60, as the systems of U.S. patents to Hayes and Slesinski rely upon. Further, the low loss lubrication systems 10, 40 result in less lubricant 20, 60 loss and less heat buildup in the differential gear housings 12, 42, than conventional systems, thereby improving the efficiency of the low loss lubrication systems 10, 40.

Also, both of the lubrication level control systems 10, 40 require less lube volume therein, which results in increased efficiency and a reduction of the power consumption therein. Specifically, the present invention's use of the lube tank 18 design, and the lube tank 48 with bladder 50 design requires a minimum of 25% less lubricant than an equivalent conventional 12 liter lubricant differential gear assembly. This result is determined by comparing the conventional assembly to the lubrication level control systems 10, 40. In addition, testing has demonstrated an incremental axle efficiency improvement of 0.15% per drive axle, by way of the lube directors 17, 47 alone. The lube level control feature will add further incremental efficiency gains that are at least in the minimum range of 0.1-0.2% incremental efficiency improvement, per drive axle.

These improvements are in part a result of the present invention lube tanks 18, 48 displacing approximately 3 liters of lube, which in turn only requires an original equipment manufacturer (OEM) to fill a differential gear assembly with 9 liters of lubricant, instead of 12 liters. These two embodiments result in a lubricant cost savings being realized, even taking into consideration the added cost associated of the lube tanks 18, 48 and bladder 50.

Consequently, these lubrication level control systems 10, 40 reduce lubricant loss, provide reduced wear at gear contact surfaces, reduce weight, improve heat transfer, reduce oil drag on parts, and use less lubricants 20, 60, thereby better utilizing energy more efficiently along with other benefits, while still providing sufficient availability of the lubricants 20, 60.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A mechanical device lubrication level control system, comprising:
    a differential axle housing, with a sump cavity having an axle gear set disposed therein, capable of containing a lubricant therein; and
    a lubricant director comprising a lube tank, with an expandable bladder disposed therein, wherein the lube tank is capable of containing a lubricant therein, and wherein the lube tank is separate from the sump cavity;
    wherein the sump cavity and the lubricant director are hydraulically connected by a passage hole and the bladder is in pneumatic communication with an air pressure source, by way of an air tube.

2. The mechanical device lubrication level control system of claim 1, wherein the lubricant in the sump cavity is in thermal communication with the differential axle housing, by way of the passage hole, in conjunction with the bladder, the lube tank, and the differential axle housing.

3. The mechanical device lubrication level control system of claim 2, wherein, at a time of lubrication of the gear set, air pressure from a pressure source is released, by a controller, into the bladder, wherein lubricant is added to the sump cavity, by way of the passage hole, so as to hydraulically communicate lubricant to the gear set;
    wherein control of the lubricant does not rely directly upon the differential gear set.

4. The mechanical device lubrication level control system of claim 2, wherein, at a time of a removal of lubricant from the sump cavity, air pressure from a pressure source is removed, by way of a controller, in the bladder;
    wherein lubricant is removed from the sump cavity, by way of the passage hole, so as to hydraulically communicate lubricant back into the bladder, where heat from the lubricant is in thermal conduction with the differential axle housing, by way of the bladder and the lube tank.

5. The mechanical device lubrication level control system of claim 1, wherein the lube tank is disposed within the differential axle housing.

6. The mechanical device lubrication level control system of claim 1, wherein the air tube protrudes through and is attached to both the differential axle housing and the lube tank.

7. The mechanical device lubrication level control system of claim 6, wherein the air tube protrudes through and is attached to an upper portion of the bladder.

8. The mechanical device lubrication level control system of claim 4, wherein a pressure regulator is disposed between the air tube and the pressure source.

9. The mechanical device lubrication level control system of claim 4, wherein the controller comprises a vehicle electronic control unit.

10. The mechanical device lubrication level control system of claim 4, wherein the controller comprises a wheel speed sensor.

* * * * *